(12) United States Patent
Borman et al.

(10) Patent No.: US 6,996,590 B2
(45) Date of Patent: Feb. 7, 2006

(54) METHOD AND SYSTEM FOR THE GARBAGE COLLECTION OF SHARED DATA

(75) Inventors: Samuel David Borman, Southsea (GB); Martin John Trotter, Ampfield (GB)

(73) Assignee: International Business Machines Corporation, Armonk, NY (US)

(*) Notice: Subject to any disclaimer, the term of this patent is extended or adjusted under 35 U.S.C. 154(b) by 467 days.

(21) Appl. No.: 10/324,548

(22) Filed: Dec. 20, 2002

(65) Prior Publication Data

US 2003/0220952 A1 Nov. 27, 2003

(30) Foreign Application Priority Data

May 25, 2002 (GB) .................................... 0212119

(51) Int. Cl.
*G06F 17/30* (2006.01)
(52) U.S. Cl. ........................................ 707/206; 707/201
(58) Field of Classification Search ............. 707/1–10, 707/100–104.1, 200–206; 719/315
See application file for complete search history.

(56) References Cited

U.S. PATENT DOCUMENTS

| 6,199,075 B1 * | 3/2001 | Ungar et al. ................. 707/206 |
| 6,249,793 B1 * | 6/2001 | Printezis et al. ............. 707/206 |
| 6,851,114 B1 * | 2/2005 | Czajkowski ................. 719/315 |
| 6,865,585 B1 * | 3/2005 | Dussud ........................ 707/206 |

* cited by examiner

*Primary Examiner*—Jeffrey Gaffin
*Assistant Examiner*—Yicun Wu
(74) *Attorney, Agent, or Firm*—Dillon & Yudell, LLP

(57) ABSTRACT

A method of garbage collection of shared data in a system heap within a data processing system, the method comprising the steps of: (a) determining if the contents of the system heap has reached a predetermined threshold, the system heap storing shared objects which are shared amongst a plurality of processes running in a data processing system; (b) in a table identifying each of the plurality of processes with a status field, setting the status field of a process which has carried out determining step (a) to a mark initiator value; (c) triggering remaining processes to mark all objects in the system heap that each process is currently using; (d) determining that each of the remaining processes has completed the marking, at step (c); (e) releasing any unmarked objects in the system heap to an object pool.

19 Claims, 4 Drawing Sheets

Fig 2b

| 250 1 | 255 MI |
| 260 2 | 265 MC |
| 270 3 | 275 MC |
| 280 4 | 285 MC |
| 290 5 | 295 MC |

Fig 2a

| 200 1 | 205 MI |
| 210 2 | 215 MR |
| 220 3 | 225 R |
| 230 4 | 235 R |
| 240 5 | 245 R |

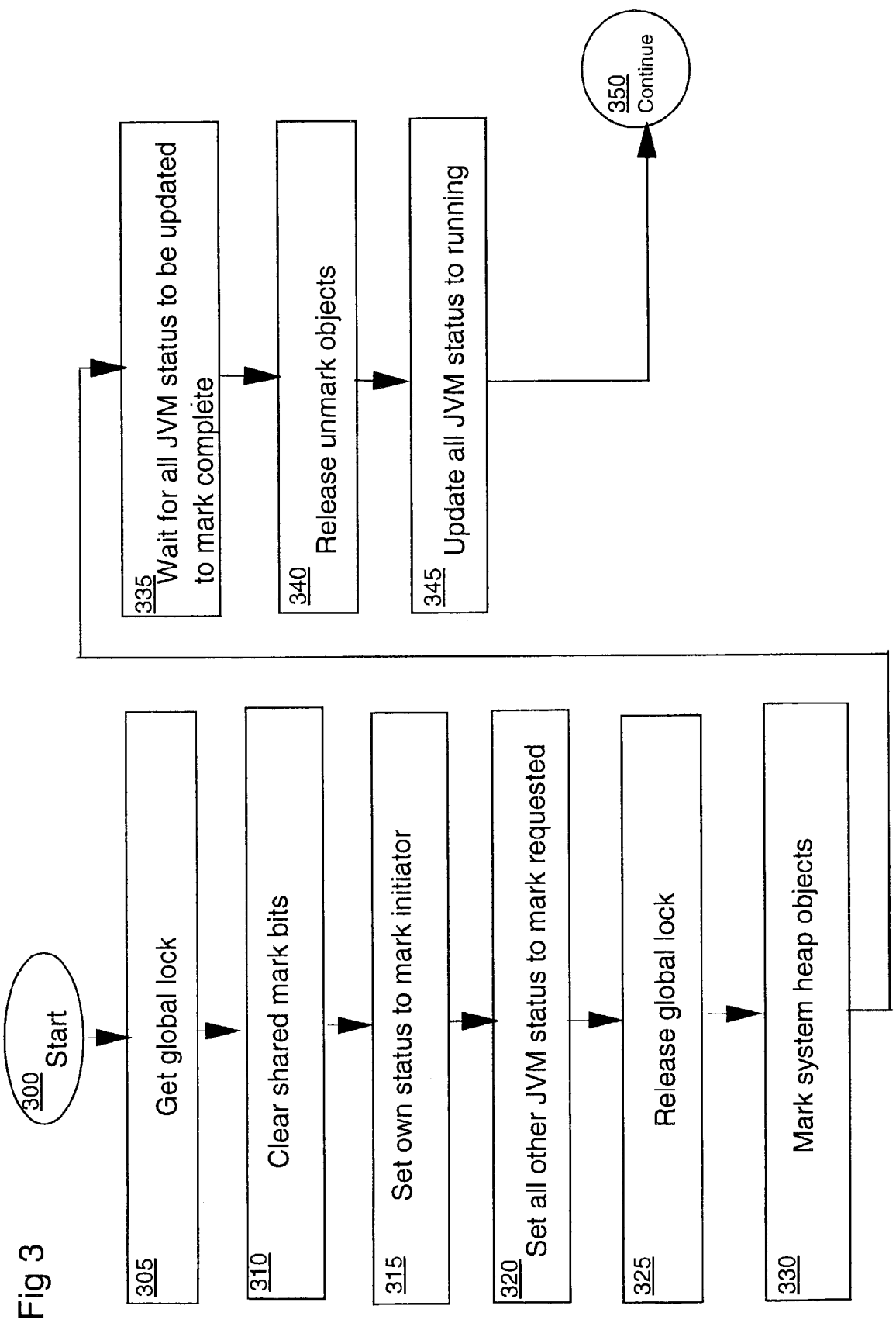

METHOD AND SYSTEM FOR THE GARBAGE COLLECTION OF SHARED DATA

FIELD OF THE INVENTION

The present invention relates to the field of data processing systems and in particular to the garbage collection of shared data.

BACKGROUND OF THE INVENTION

People today use the World Wide Web for a variety of different and diverse tasks for example locating information, ordering and buying goods on-line and managing their finances. Users expect that these applications will operate regardless of what type of computer platform is used. It would be inconvenient and cumbersome if a different application had to be launched for each type of computer platform. This would be an inconvenience not only for the users of the launched application but the application developers as well.

Java technology, which is a trademark of Sun Microsystems, Inc, provides a solution to this problem by allowing the creation of computer platform independent programs. The Java technology consists of an object orientated programming language and a platform on which to run the Java applications. Java is both a compiled and an interpreted language. The source code that has been written by the application developer is compiled into an intermediate form called a Java bytecode, which is a platform independent language and sent over the network to a client machine where the java bytecodes are interpreted by the Java platform and the Java interpreter parses and runs each Java bytecode instruction on the computer.

Java's objected orientated programming language is based on using objects and classes and this paragraph will introduce the reader to a few basic concepts. Just like real world objects, software objects consist of a state and a behavior. A software object maintains its state in one or more variables and a variable is an item of data named by an identifier. A software object implements its behavior with methods and a method is a function associated with an object. Just like any other objected orientated programming language objects communicate with each other by passing messages. Further object orientated concepts are well known in the art and will not be described here further.

The Java platform consists of the Application Programming Interface (API), which is a large collection of ready-made software components, which provide a variety of capabilities, and the Java Virtual Machine (JVM) which will be explained in the paragraph below. Together the JVM and the API sit on top of the hardware based computer platform and provide a layer of abstraction between the Java program and the underlying hardware.

The JVM is made up of software, which can run a Java program on a specific computer platform of a client machine. Before a Java program can be run on a JVM, the Java program must first be translated into a format that the JVM recognizes, which is called a Java class file format. The Java class file format contains all the information needed by a Java runtime system to define a single Java class.

The JVM running on a particular computer can be divided into four basic parts: the registers, the stack, the garbage-collected heap, and the method area.

Like most other object-orientated applications, a Java application typically allocates new objects to a region of the system memory within a data processing system commonly referred to as the 'heap' and each JVM has its own heap. Java does not have a 'free' or 'delete' method, which allows a Java application to free objects that are no longer required by the system. Instead when a Java application executes on a particular computer platform the Java application relies on a garbage collection process which is the responsibility of the JVM, to reclaim space within the heap that is no longer utilized by previously allocated objects.

When the client computer invokes a method on a remote object, a message is sent to the server process that hosts the remote object. The message must specify which particular object is to have its method invoked. For example the object to which the message is addressed (yourCar) and the name of the method to perform (changeGears) and any parameters needed by the method (higherGear).

A remote object reference is an identifier for a remote object that is valid throughout the computer system. An object is determined as being live whilst there is an object reference pointer to it somewhere in the active state of the JVM and therefore the object is able to be located. When an object ceases to be referenced from the active state within the JVM it can be classified as garbage. The memory space occupied by the object can then be reclaimed for reuse and garbage collected. Garbage collection is usually triggered whenever the Java application attempts to create a new object, and it is determined that there is insufficient free space available within the heap to satisfy an object allocation.

Garbage collection is usually performed in a synchronous manner. Generally, the synchronous garbage collection begins its operation by temporarily stopping all Java applications within the JVM. The synchronous garbage collection then traverses a Java stack and the heap in order to search for all the active objects and their children. These active objects and their children are then marked accordingly. Afterwards the heap is searched again for a second time to reclaim any space previously utilized by the unmarked objects. Finally the Java applications are restarted again. This type of garbage collection is typically called 'stop the world' as all applications are stopped whilst garbage collection is performed and restarted when the garbage collection process has finished.

When multiple JVM's are running on the same computer, there arises a need to minimize the footprint of each JVM, such that memory resources are utilized to their full advantage and therefore it is important to share as much data as possible with other individually running JVM's on the same computer. Typically the data to be shared between the multiple JVM's could be any read only data for example all Java classes together with their bytecode and equivalent Just-In-Time (JIT) code, or the data structures representing methods and classes. A Just-In-Time code generator generates JIT code, which is a technique for speeding up the execution of interpreted programs such as Java. JIT code is created before a method is run for the first time. The Java interpreter converts the Java byte code for the method into native machine code, which, the computer can then execute directly rather than via a Java interpreter.

Generally the shared data that is used by multiple JVM's on the same computer is not stored in the heap of any one JVM, but instead it is stored in a shared area called the system heap. Often the system heap is not garbage collected as multiple JVM's running on the same computer could each have a reference or many references to a shared object or any other shared data in the system heap. This leads to an environment, in which it is difficult to determine which objects are live within the system and which are eligible for garbage collection as there currently is no means in which to co-ordinate the actions of multiple JVM's running on the same computer, to determine whether an object can be garbage collected to free the resources that the object utilized.

The problem has been described only in the context of Java, but the same problem arises in other programming environments where there is a need for the automatic reclamation of heap-allocated storage after its last use by a program and further when there arises a need for automatic dynamic memory management. An example of other programming environments are, but not limited to C, C++, Smalltalk, Eiffel, Dylan, Modula-3 and Oberon.

SUMMARY OF THE INVENTION

In accordance with the present invention there is now provided a method of garbage collection of shared data in a system heap within a data processing system, the method comprising the steps of: (a) determining if the contents of the system heap has reached a predetermined threshold, the system heap storing shared objects which are shared amongst a plurality of processes running in a data processing system; (b) in a table identifying each of the plurality of processes with a status field, setting the status field of a process which has carried out determining step (a) to a mark initiator value; (c) triggering remaining processes to mark all objects in the system heap that each process is currently using; (d) determining that each of the remaining processes has completed the marking, at step (c); (e) releasing any unmarked objects in the system heap to an object pool.

The method provides an advantage in that the actions of the plurality of JVM's running on the same data processing system can be co-coordinated and once the objects are marked it is apparent which objects are suitable for garbage collection. The method provides a further advantage such that all the processes running on the same data processing system are not required to stop working whilst garbage collection is being carried out.

Viewed from another aspect the present invention provides a system for carrying out the method described above.

Further the invention provides a computer program product, for instructing a data processing system to carry out the method described above.

BRIEF DESCRIPTION OF THE DRAWINGS

A preferred embodiment of the invention will now be described in detail by way of example only with reference to the following drawings:

FIGS. 2a and 2b illustrates a shared table used for containing a process ID and a status of all the processes running on a data processing system in accordance with a preferred embodiment of the present invention;

FIG. 3 illustrates the process that a mark initiator process follows to enable the co-ordination of all other processes within the data processing system in accordance with a preferred embodiment of the present invention;

DETAILED DESCRIPTION

Figure 1:
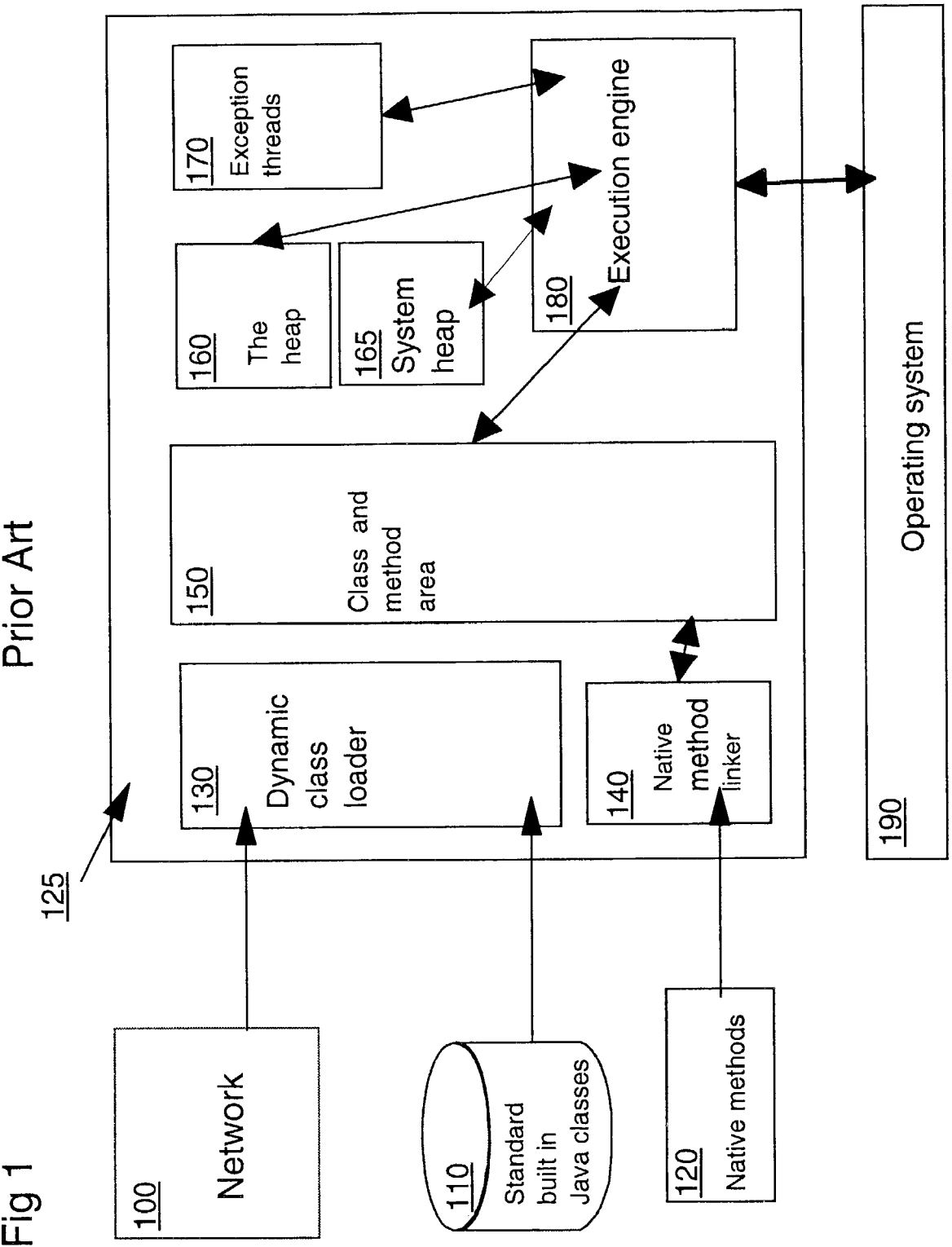
FIG. 1 illustrates the Java environment and its components as in the prior art.

FIG. 1 is a block diagram illustrating a Java environment as it exists on a computer platform. Examples of such computer platforms are IBM compatible personal computers, Macintosh computers, and Unix workstations.

Referring to FIG. 1, a Java runtime environment is shown and follows the well-known architecture as specified in the JVM specification from Sun Microsystems. A Java application can create new objects and arrays, which the JVM 125 stores in a block of memory called the heap 160. A system heap 165 stores the shared data that the individually running JVM's share in a data processing system.

The execution engine 180 carries out the instructions contained in the byte code of a Java method. The dynamic class loader 130 loads the classes that a Java program requires in order to run. The loading of the classes involves obtaining in bytes the Java class file that defines a class. This can be achieved by reading a file from a disk or over a network 100. Java uses exception threads 170 to signal that there is an error within the program. Each method defines an exception handler table that lists which exceptions the method catches.

Classes can contain native method 120 declarations. The body of the method is not provided as Java bytecode in a class file, but instead is written using another programming language and compiled into machine code stored in a separate Dynamic Link Library (DLL) which is an executable program module that performs a particular function, or a shared library. Runtime systems include code to dynamically load and execute the code in native methods using calls made to the operating system 190 that use DLL's in Microsoft Windows, which is a trademark of Microsoft Corp, or shared libraries in UNIX. Once a native method 120 has been linked into the runtime system by the native method linker 140, the execution engine 180 traps calls to the native method 120 and routes these to the underlying native code. The dynamic class loader 130 loads, links and initializes classes. The first time a class is referenced, its class file is located; the bytes in the class file are loaded into memory and the class in further linked into the runtime system at initialization.

The JVM 125 includes an instruction that allocates memory on the heap 160 for a new object but includes no instruction for freeing the memory. The JVM 125 is responsible for deciding when to free memory occupied by objects that are no longer referenced by the running application. Usually, a JVM 125 uses a garbage collector thread to manage the heap 160. Or the JVM can use a thread provided by the Java application to carry out the garbage collection. This provides an advantage of allowing the Java application to initiate its own garbage collection process without having to stop all other JVM'S.

While only one JVM is shown in FIG. 1, it is commonly the case that a plurality of such JVM's are running on the same machine as explained above. A description will now be given of preferred embodiments of the present invention, which enables the garbage collection of the system heap in this plural JVM environment.

To enable the garbage collection of the shared data in the system heap used by multiple JVM's, an object in the system heap must be identified as either an object, which is alive within the system, or as an object that can be removed from the system heap, thereby releasing memory used by the object To achieve this an object in the system heap is marked by a bit, such that each object can be identified as 'reachable' and the objects within the system heap that are not marked by a bit and thus not identified as 'reachable' can be classified as appropriate for garbage collection. The marking of an object can be carried out in a number of ways. A separate shared area can be utilized to hold all of the mark bits; a bit would cover a predefined amount of the shared heap, which typically is 8 bytes. A bit corresponding to the start address of each shared object would be set to indicate a mark. A bit within the object itself could also be allocated and set when the object is marked. To trigger the process of garbage collection of the shared data in the system heap, the system heap is monitored to determine whether its contents has reached a predetermined threshold (that is the system heap is filled with data to a certain threshold level, for example 80% full) and needs to be garbage collected. At least one of the running JVM's has the capability of detecting whether the system heap has reached a predetermined threshold. Once such detection is made, one of the JVM's (e.g., the one that performed the detection) elects itself the role of mark initiator (MI) and begins the process of monitoring all the JVM's access to the system heap, running on the data processing system.

Referring to FIGS. 2*a* and 2*b*, a shared table is defined for keeping track of all the running JVM's; each of the running JVM's can either be classed as an initiator process or a worker process, which is accessing the system heap. The initiator process is the mark initiator as described above. The worker processes are the remaining running JVM's. The shared table contains a process ID 200 and a status field 205 of each initiator or worker JVM. A JVM can have a status of running (R) 225, mark initiator (MI) 205 or mark complete (MC) 265. As each JVM is working through the process of marking any shared objects, its status will be updated in the shared table. Only one JVM can update its status in the shared table at any given time and by using a global lock one JVM can deny concurrent access to all other JVM's. A status of running (R) 225 signifies to the initiator JVM that the worker JVM is carrying out its normal duties. The status of mark initiator 205 is the status that the initiator JVM takes upon itself when the initiator JVM begins the task of triggering the other worker JVM's to start marking their objects. At JVM initialization time the process ID's of all running JVM's are added to the shared table.

In FIG. 2*a* the process ID 1 200 has a status of mark initiator. The mark initiator will monitor the shared table until all running JVM's have a status of mark complete (MC) 265 in the shared table and the mark initiator JVM is then able to locate all unmarked objects in the system heap. The mark initiator 205, will update the status fields of all other worker JVM's to a status of mark requested (MR) in the shared table 215, from their previous status of running (R) 225, 235 and 245 to indicate to the worker JVM's that they should traverse their own heap and the system heap locating references to shared objects.

Referring to FIG. 2*b*, once all worker JVM's have completed the task of marking all shared objects, each JVM 260, 270, 280 and 290 will sequentially take control of the global lock and update their status in the shared table to mark complete 265, 275, 285 and 295.

Referring to FIG. 3, at step 305, the initiator JVM takes control of the global lock. At step 310, the initiator JVM clears all references to the shared mark bits in the marked objects of the previous garbage collection cycle and at step 315, sets its own status value to mark initiator in the status field 205 of the shared table and sets all other status values for each worker JVM to mark requested at step 320, and releases the global lock at step 325. At step 330, the initiator JVM traverses its own heap and the system heap to locate shared objects and marks the shared objects accordingly. At step 335, the mark initiator JVM waits for all other worker JVM's to update their status to mark complete in the shared table.

Figure 4:
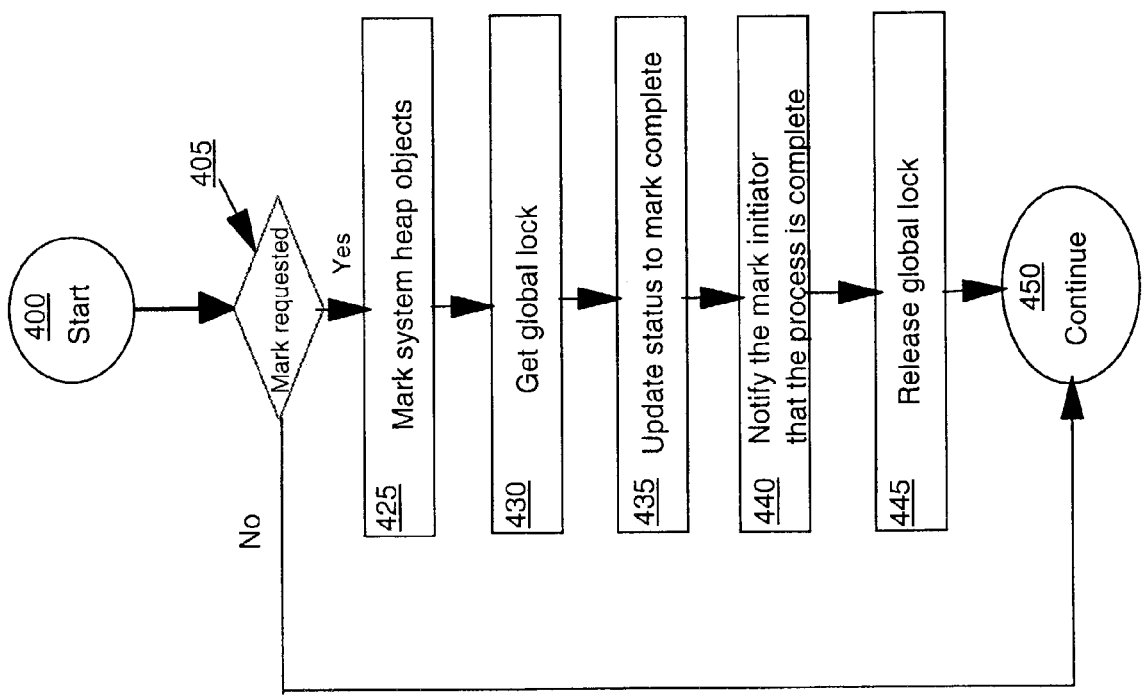
FIG. 4 illustrates the process that a worker JVM will follow to allow the marking of an object in a heap and in a system heap, in accordance with a preferred embodiment of the present invention.

Referring to FIG. 4 at step 405, each of the worker JVM's periodically polls its own status value in the shared table to detect if the status value has been updated to mark requested; the most appropriate and advantageous time to do this would be during garbage collection. If mark requested, is not detected control flows to step 450, where the worker JVM carries on with its normal operations. When a worker JVM detects that its status field has a value of mark requested, control flows to step 425, where the worker JVM traverses its own heap and the system heap looking for references to shared objects and when a shared object has been located the JVM sets the appropriate mark bits in the located shared objects. The worker JVM can either mark the bit by taking control of the global lock at step 430, or could perform an atomic update and therefore does not require a lock.

Once the worker JVM has completed the task of marking a shared object, the worker JVM takes control of the global lock at step 430, and updates its own status in the shared table to mark complete at step 435. Each worker JVM notifies the mark initiator at step 440, that it has completed marking all objects and then releases the global lock at step 445. Each worker JVM will notify the mark initiator in turn, as the mark initiator cannot release the unmarked objects back to an object pool until all the status values of all other worker JVM's have been updated to mark complete 265, 275, 285 and 295.

Turning back to FIG. 3, as part of step 335, the mark initiator periodically polls the status field values in the shared table. When all worker JVM's have reached the status of mark complete, the mark initiator completes the garbage collection task by releasing any unmarked objects at step 340 back to the object pool. Finally, at step 345, the mark initiator JVM takes the global lock, resets all JVM status values including its own to running and continues its normal duties at step 350.

If any JVM creates an object in the system heap while its status is mark requested or mark completed it must ensure that the object is not garbage collected. This can be achieved by marking or by allocating the object from a new object pool, which is not to be garbage collected in this cycle. This approach is preferable, as system performance is preserved.

If a JVM terminates due to system failure or the JVM terminates normally, its associated process ID and status is removed from the shared table. It is equally possible for a new JVM to start up before all JVM's have reached the status of mark complete in the shared table. If this situation should arise, the JVM enters its process ID and status into the shared table by taking control of the global lock as part of step 305 in FIG. 3. The worker JVM polls the shared table to see if mark initiator 205 has been updated in the shared table. 1*f* the answer is positive the JVM updates its status to mark complete 265, otherwise the status is running 225. This method of garbage collection allows the system heap to be garbage collected without having to stop all processes.

What is claimed is:

1. A method of garbage collection of shared data in a system heap within a data processing system, the method comprising the steps of:

(a) determining if the contents of the system heap has reached a predetermined threshold, the system heap storing shared objects which are shared amongst a plurality of processes running in a data processing system;

(b) in a table identifying each of the plurality of processes with a status field, setting the status field of a process which has carried out determining step (a) to a mark initiator value;

(c) triggering remaining processes to mark all objects in the system heap that each process is currently using;

(d) determining that each of the remaining processes has completed the marking, at step (c);

(e) releasing any unmarked objects in the system heap to an object pool.

2. A method as claimed in claim 1, wherein the step of triggering further comprises updating the status field of a process in the table to a new status value.

3. A method as claimed in claim 1, wherein the table further comprises a process ID field associated with the status field.

4. A method as claimed in claim 1, wherein the step of triggering further comprises updating a status field of each remaining process to a value of mark requested and each remaining process polling the shared table to identify if its status has been updated to the mark requested value.

5. A computer program product comprising computer program code stored on a computer readable storage medium, which when executed on a data processing system, instructs the data processing system to carryout the method as claimed in claim 1.

6. The method of claim 1, wherein the plurality of processes are a plurality of Java Virtual Machines (JVM's), and wherein the step of determining if the contents of the system heap has reached the predetermined threshold is performed by a designated JVM from the plurality of JVM's.

7. The method of claim 6, wherein the designated JVM uses a thread from an executing Java application in a worker JVM to perform garbage collection on behalf of the executing Java application, such that each Java application initiates its own garbage collection process without having to stop other JVM's in a plurality of JVM's running on a computer system.

8. The method of claim 6, wherein the designated JVM uses a resident thread in the designated JVM to perform garbage collection on behalf of other worker JVM's, such that the designated JVM initiates a garbage collection process in each worker JVM independently without having to stop other JVM's in a plurality of JVM's running on a computer system.

9. The method of claim 6, further comprising:
creating a shared table to keep track of all running JVM's, wherein each of the running JVM's is classed as an Mark Initiator (MI) JVM, a Running (R) JVM, or a Mark Complete (MC) JVM, and wherein the shared table contains a process identifier and a status field corresponding to each MI, R or MC JVM, and where in R signifies to MI JVM that R JVM is carrying out normal duties without marking any objects for retention of deletion, and wherein MC signifies to MI JVM that MC JVM has completed a mark request identifying an object as being retained or deleted;
in response to the MC JVM completing marking of objects to be retained or deleted, resetting by the MI JVM all of the process identifiers and status fields to reflect a normal running status of all JVM's; and
returning any object that has not been marked for deletion by any JVM to a pool of objects available to any JVM.

10. The method of claim 9, wherein marking of objects by the MC JVM is under a control of a global lock.

11. A system of garbage collection of shared data in a system heap within a data processing system, the system comprising:
(a) means for determining if the contents of the system heap has reached a predetermined threshold, the system heap storing shared objects which are shared amongst a plurality of processes running in a data processing system;
(b) in a table identifying each of the plurality of processes with a status field, means for setting the status field of a process which has carried out determining step (a) to a mark initiator value;
(c) means for triggering remaining processes to mark all objects in the system heap that each process is currently using;
(d) means for determining that each of the remaining processes has completed the marking, at step (c);
(e) means for releasing any unmarked objects in the system heap to an object pool.

12. A system as claimed in claim 11, wherein the means for triggering further comprises a means for updating the status field of a process in the table to a new status value.

13. A system as claimed in claim 11, wherein the table further comprises a means for a process ID field associated with the status field.

14. A system as claimed in claim 11, wherein the means for triggering further comprises means for updating a status field of each remaining process to a value of mark requested and a means for each remaining process polling the shared table to identify if its status has been updated to the mark requested value.

15. The system of claim 11, wherein the plurality of processes are a plurality of Java Virtual Machines (JVM's), and wherein the means for determining if the contents of the system heap has reached the predetermined threshold includes a designated JVM from the plurality of JVM's.

16. The system of claim 15, wherein the designated JVM uses a thread from an executing Java application in a worker JVM to perform garbage collection on behalf of the executing Java application, such that each Java application initiates its own garbage collection process without having to stop other JVM's in a plurality of JVM's running on a computer system.

17. The system of claim 15, wherein the designated JVM uses a resident thread in the designated JVM to perform garbage collection on behalf of other worker JVM's, such that the designated JVM initiates a garbage collection process in each, worker JVM independently without having to stop other JVM's in a plurality of JVM's running on a computer system.

18. The method of claim 15, further comprising:
means for creating a shared table to keep track of all running JVM's, wherein each of the running JVM's is classed as an Mark Initiator (MI) JVM, a Running (R) JVM, or a Mark Complete (MC) JVM, and wherein the shred table contains a process identifier and a status field corresponding to each MI, R or MC JVM, and wherein R signifies to MI JVM that R JVM is carrying out normal duties without marking any objects for retention of deletion, and wherein MC signifies to MI JVM tat MC JVM has completed a random request identifying an object as being retained or deleted;
means for, in response to the MC JVM completing marking of objects to be retained or deleted, resetting by the MI JVM all of the process identifiers and stabs fields to reflect a normal running status of all JVM's; and
means for returning any object that has not been marked for deletion by any JVM to a pool of objects available to any JVM.

19. The system of claim 18, wherein the marking of objects by the MC JVM is under a control of a global lock.

* * * * *